Patented June 19, 1934

1,963,257

UNITED STATES PATENT OFFICE 1,963,257

SEPARATION AND PURIFICATION OF SULPHONATES WITH AMMONIA

John C. Bird, Elizabeth, and Raphael Rosen, Cranford, N. J., assignors to Standard Oil Development Company, a corporation of Delaware No Drawing. Application January 6, 1932
Serial No. 585,158

7 Claims. (Cl. 260—159)

This invention relates to a new process for the separation and purification of sulphonic acids and salts thereof and more particularly to the purification with liquid ammonia of water-soluble alkali sulphonates obtained from petroleum oil acid sludge. This invention relates especially to the use of liquid ammonia as a selective solvent for the extraction of valuable products from acid sludge.

When hydrocarbon oils such as petroleum oils, coal tar distillates, products of liquefaction of coal, lignite, peat, etc. and their distillation or conversion products of destructive distillation, hydrogenation, destructive hydrogenation and the like are treated with strong sulphuric acid or sulphuric anhydride, a by-product commonly known as acid sludge is formed. This product is normally heavier than the oil treated and separates as a bottom layer, especially when the treating is conducted with strong or fuming sulphuric acid. This sludge is usually considered to consist of various components, especially of sulphonic acids, other organic material, and excess sulphuric acid, some of which are in solution while others are colloidally dispersed throughout the sludge.

Various methods of obtaining the sulphonic acids separately from acid sludge are known and this invention is generally applicable for the preparation of purified sulphonic acids and sulphonates obtained from acid sludge by all known methods. A preferred process for obtaining separation of the components of acid sludge is described in co-pending application No. 585,707 filed January 9, 1932, by John C. Bird. According to this process oxygenated organic solvents, such as isopropyl alcohol and other aqueous alcohols, are used as selective solvents for the extraction of sulphonic acids or sulphonates from acid sludge or neutralized acid sludge, respectively. This process for obtaining alkali sulphonates from acid sludge is described in the following example:

*Example 1.*—50 pounds of an acid sludge obtained by treating "white oil" stock with sulphuric acid was mixed with 52.5 pounds of water and agitated at about 90° C., steam being blown through the mixture to drive off the sulphur dioxide. After several hours steaming under these conditions, the mixture was allowed to stand and settle for about 3 to 4 hours.

The bottom layer containing sulphuric acid was drawn off, and the top layer was neutralized with 16.7 pounds of 50% caustic soda solution. Approximately 94 pounds of 91% isopropyl alcohol was then added, and the mixture was allowed to stand over night.

After standing, the top layer of the alcohol extract was drawn off and the alcohol distilled off at about 90 to 92° C., after which the liquor was transferred into a steam jacketed pan and evaporated down to dryness. A yield of 50.3% of sodium sulphonates of good color and wetting properties was obtained, based on the original sludge.

The heating of the sludge shown in the above example to drive out sulphur dioxide may be eliminated, especially when the sludges are obtained by treating low temperature distillate oils containing little or no asphalt. Any decomposition of sulphonates due to heating may thereby be avoided and products superior even to that described above may be obtained. It is preferable that all treatment of the acid sludge before neutralization be conducted at temperatures below about 130° C.

When the sulphonates are to be produced from heavy residual oil acid sludges obtained from asphaltic or mixed base crudes, such as Ranger, it is preferred to first dilute the sludge with water and to agitate it with steam to cause a separation of oily material as a top layer and of an insoluble coagulant of tarry matter. The tarry matter and oil are removed and the acid solution remaining is then suitable for treatment as described in the above example.

It has now been found that a portion of these sulphonates is soluble in liquid ammonia, and that this portion is of even lighter color and higher purity than the original mixture obtained from acid sludge. This method of purification is illustrated by the following example:

*Example 2.*—20 grams of sodium sulphonates prepared as in Example 1, were added to about 200 cc. of liquid ammonia and the mixture was thoroughly stirred. The mixture was then filtered through coarse paper and there was obtained, on evaporating the ammonia from the filtrate, 7 grams of a light colored powder. This powder consisted of the purified relatively low molecular weight fraction of sodium sulphonates. It was much lighter in color than the original mixture of sulphonates. Aqueous solutions of both the original and purified sulphonates were prepared, the original requiring dilution to two and a half times the volume of the purified sulphonate solution to equal the latter in lightness of color. In a comparative test of wetting rate with paper previously wet with a ¼% aqueous solution of the sulphonates and dried, a standard area of the paper containing the purified sulphonates was wet, by dipping the lower edge of the paper into water, in 36 seconds. The wetting of an equal area of the paper containing the original sulphonates required 53 seconds.

In explanation, the liquid ammonia appears to act as a selective solvent for the sulphonates of low molecular weight leaving a residue containing undissolved high molecular weight sulpho bodies and dark colored bodies.

This purification with liquid ammonia may also be employed with the original sludge, the washed sludge, the sulphonic acids obtained therefrom, or with neutralized mixtures containing sulphonates at any of these respective stages. For example, purified water-soluble alkali sulphonates may be obtained by direct extraction with liquid ammonia of washed acid sludge, neutralized with an alkali. Ammonia may also be used for the neutralization of the sludge.

The ammonia extraction is especially desirable for obtaining purified water-soluble alkali sulphonates since no precipitation occurs on neutralizing acid sludge with alkali, the heavier dark colored matter being peptized into the colloidal solution as a dark brown liquid. Separation of the light from the so-called heavy alkali sulphonates is a matter of considerable difficulty as ordinary organic solvents, such as benzene, are not suitable for the extraction, but form emulsions. The light molecular weight sodium salts appear to be entirely soluble in liquid ammonia and may be easily obtained therefrom by evaporating the solvent. Dark colored or contaminated light salts may be thus purified by dissolving them in ammonia and separating the solution from the undissolved residue which may be accomplished by filtration, decantation, centrifugal action or other suitable means. The extraction may also be conducted at atmospheric or higher temperatures, with correspondingly increased pressure.

These purified water-soluble alkali sulphonates are especially suitable for use as wetting and penetrating agents where purity and lightness of color are desirable.

This invention is not to be limited to any examples which are given herein solely for purpose of illustration but only by the following claims in which we wish to claim all novelty insofar as the prior art permits.

We claim:

1. Process for preparing sulphonates of high purity comprising contacting sulphonates comprising salts of water soluble sulphonic acids obtained from petroleum, with liquid ammonia, separately withdrawing a solution of sulphonates of increased purity in the liquid ammonia and recovering the purified sulphonates from the solution.

2. Process for obtaining alkali sulphonates of water-soluble sulphonic acids of high purity from hydrocarbon oil acid sludge comprising contacting said sludge with water to remove free sulphuric acid, neutralizing the washed sludge with an alkali, extracting alkali sulphonates from the neutralized sludge with aqueous alcohol, separating the sulphonates in a substantially dry form from the solution, and contacting the dried sulphonates with liquid ammonia to obtain a solution comprising purified sulphonates in the ammonia, separately withdrawing said solution and recovering the purified sulphonates therefrom.

3. Process according to claim 2 in which the alkali is selected from the group consisting of sodium hydroxide, sodium carbonate and ammonia.

4. Process according to claim 2 in which the aqueous alcohol is isopropyl.

5. Process according to claim 2 in which the extraction with liquid ammonia is conducted at pressures above atmospheric.

6. A process for obtaining water soluble alkali sulphonates from hydrocarbon oil acid sludge comprising neutralizing the sludge with an alkali and extracting a light colored water-soluble product comprising purified alkali sulphonates from the neutralized sludge with liquid ammonia.

7. A new composition of matter consisting of a solution containing alkali petroleum sulphonates in liquid ammonia.

JOHN C. BIRD.
RAPHAEL ROSEN.